United States Patent [19]

Hamada

[11] 4,015,539
[45] Apr. 5, 1977

[54] TRANSPORTATION SYSTEM AND VEHICLES THEREFOR

[75] Inventor: Mitsuharu Hamada, Yokohama, Japan

[73] Assignee: Nissan Motor Co., Ltd., Yokohama, Japan

[22] Filed: Aug. 11, 1975

[21] Appl. No.: 603,780

[30] Foreign Application Priority Data

Aug. 16, 1974 Japan ................ 49-93965

[52] U.S. Cl. .................... 104/130; 104/244.1; 180/131

[51] Int. Cl.² .......................... B62D 3/00

[58] Field of Search ....... 104/130, 242, 243, 244.1, 104/245, 145, 247; 105/215 R; 180/79, 131

[56] References Cited

UNITED STATES PATENTS

| | | | |
|---|---|---|---|
| 3,095,827 | 7/1963 | Chadenson | 104/130 |
| 3,254,608 | 6/1966 | Alden | 104/130 |
| 3,340,822 | 9/1967 | DeLaSalle | 104/130 |
| 3,788,233 | 1/1974 | Colouas et al. | 104/247 |
| 3,828,691 | 8/1974 | Purath | 105/215 R |
| 3,861,321 | 1/1975 | Goodnight et al. | 104/130 |
| 3,913,491 | 10/1975 | Auer, Jr. et al. | 104/130 |

*Primary Examiner*—Robert J. Spar
*Assistant Examiner*—James M. Slattery
*Attorney, Agent, or Firm*—Lowe, King, Price & Markva

[57] ABSTRACT

Guide track and vehicle construction for Dual-Mode Vehicle system. The vehicle is steered through junctions to a desired direction on the track by a hydraulic control system mounted on the vehicle and a mechanical control device provided on the guide track.

Guide followers attached to the steering system of the vehicle ride within respective channels on opposite sides of the track. One or the other of the guide followers is held in the actuated position, i.e., engaged with the respective channel, to operate the hydraulic system for guiding the vehicle in the desired path on the track.

11 Claims, 9 Drawing Figures

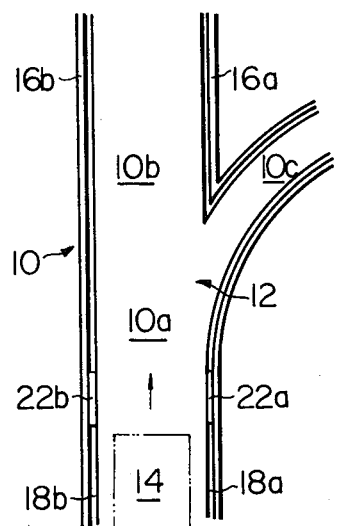
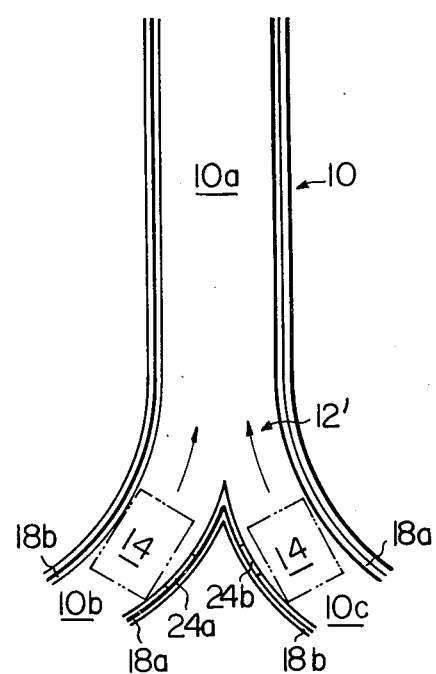
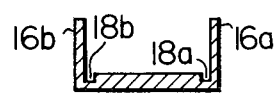
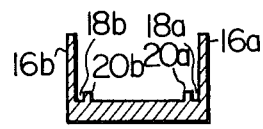
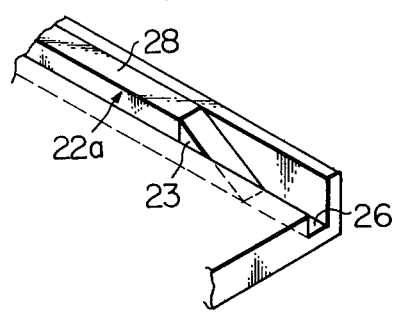

TRANSPORTATION SYSTEM AND VEHICLES THEREFOR

This invention relates to transportation system and to vehicles useful on such systems.

There is currently considerable concern as to the adequacy of the present type of mass transportation systems. Automobile highway systems, the present most commonly used transportation medium, while offering great convenience through the use of personal vehicles, have major disadvantages in terms of construction expense, the amount of land required (both from cost and esthetic viewpoints), the lower passenger density on the highways as compared with other transportation systems, automobile parking problems in the metropolitan areas, and air pollution caused by the presently used vehicles. Conventional railway systems apparently do not provide an adequate solution since they fail to provide a high level of mobility. Among the various systems that have been proposed in view of the above are Dual-Mode Vehicle systems which are envisaged as providing for operation of the vehicles under automatic control on specially constructed "tracks" and under manual control on the usual types of highways to facilitate the collection and distribution of passengers.

It is a general object of this invention to provide a new and improved transportation system which may be advantageously employed both in commuting environments adjacent metropolitan areas for example and also in high speed longer distance transportation environments.

Another object of the invention is to provide a transportation system which enables integration of private vehicles such as may be driven on highways in a conventional manner into a high density controlled transportation system.

A further object of the invention is to provide an improved track on which vehicles move in a controlled manner.

Still another object of the invention is to provide an improved vehicle construction capable of moving on a specially constructed track.

A further object of this invention is to provide a new and improved transportation system in which a vehicle can easily pass through junctions of a track and be directed to a desired direction.

Other objects, features and advantages of the invention will be seen as the following description of preferred embodiments thereof progresses in conjunction with the drawings, in which:

FIG. 1 is a plan view of a track having one type of a junction of a transportation system constructed in accordance with the principle of the invention in which a vehicle moving therealong is shown in phantom;

FIG. 2 is a plan view similar to FIG. 1 but shows the track having another type of a junction;

FIG. 3A is a section view of an example of the track as shown in FIGS. 1 and 2;

FIG. 3B is a section view similar to FIG. 3A but shows another example of the track;

FIG. 4 is an enlarged perspective view of a guide channel and a longitudinal projection of the track;

Figure 5:
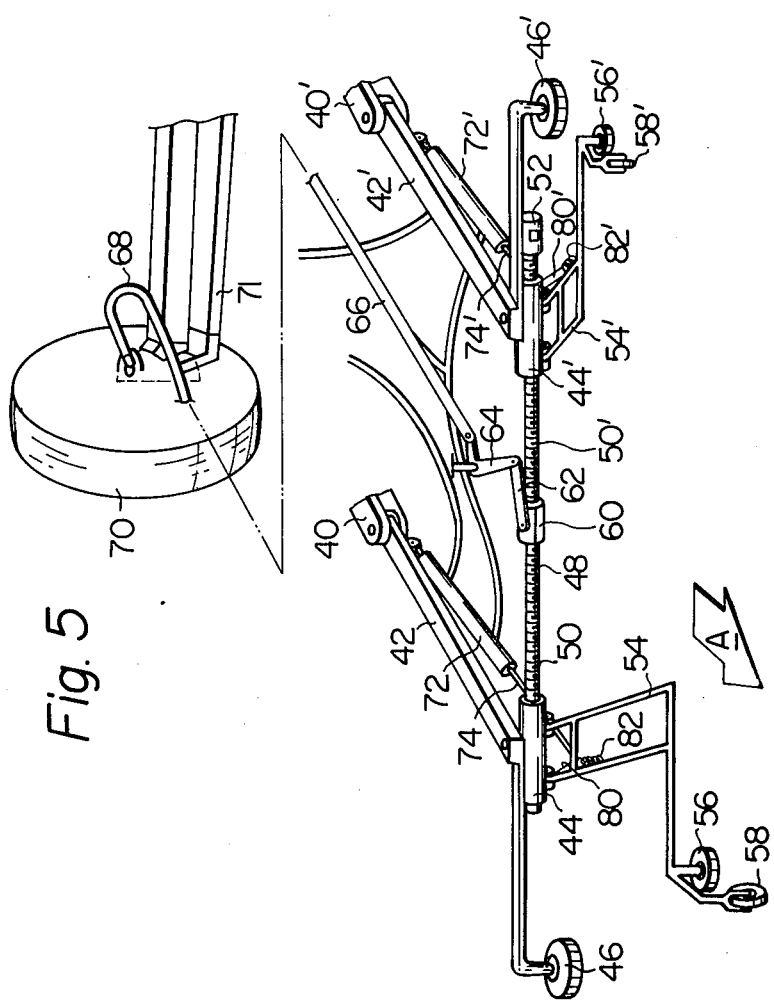
FIG. 5 is a perspective view of a steering system arranged in accordance with the principles of the invention.

Referring now to FIGS. 1 to 4, there are shown tracks 10 of a transportation system constructed according to principles of the present invention. The tracks 10 define a vehicle path and provide a support for a vehicle as it moves therealong. The track 10 shown in FIG. 1 includes a junction 12 in which one portion 10a of the track is branched off into two portions 10b and 10c assuming the vehicle shown in phantom at 14 cruises in the direction of the arrow (no numeral). The track 10 shown in FIG. 2 includes a junction 12' in which two portions 10b and 10c of the track join into one portion 10a assuming the vehicles shown in phantom at 14 cruise in the direction of the arrows (no numerals). The track 10 is equipped with first and second guide walls 16a and 16b at the respective sides thereof as clearly illustrated in FIGS. 3A and 3B. Right and left guide channels 18a and 18b are respectively disposed on opposite sides of the track 10 and adjacent to the first and second guide walls 16a and 16b. The guide channels may be formed by providing two ridges 20a and 20b on the track 10 adjacent to and spaced to some extent from the guide walls 16a and 16b as illustrated in FIG. 3B.

Disposed within the guide channels 18a and 18b and located somewhat before the junction 12 in FIG. 1 are longitudinal movable projections 22a and 22b which longitudinally extend along the guide channels and are arranged to be projected or withdrawn with respect to the bottom surface of the guide channels in response to operation signals transmitted from the vehicle 14 or by means of a control device (not shown) equipped on the track 10. In FIG. 4, the projection 22a is rectangular in plan and its at least one end portion 23 far from the junction 12 is formed into a wedge shape which provides a sloped surface substantially extending from the level of the bottom surface 26 of the guide channel to the level of the top surface 28 of the longitudinal projection 22a. The projection 22b is similar in construction to the projection 22a.

As illustrated in FIG. 2, a portion 10b of the track 10 is equipped with a longitudinal stationary projection 24a on its right side guide channel 18a, which projection 24a is located somewhat before the junction 12'. On the contrary, a portion 10c of the track is equipped with a stationary projection 24b and is located somewhat before the junction 12'. The stationary projections 24a and 24b are similar in shape to the movable projections 22a and 22b, but are different in the relationship with respect to the corresponding guide channels in which the projections 24a and 24b are respectively fixedly disposed within the corresponding guide channels.

With reference to a vehicle steering system shown in FIG. 5, the steering system is disposed at the front portion of the vehicle 14 (not shown in this figure) which is movable along the track as indicated in FIGS. 1 to 4. The steering control system comprises first and second support members 40 and 40' which are secured to the front portion of the vehicle body (not shown). On the support members 40 and 40', first and second L-shaped members 42 and 42' are respectively pivotally mounted at one of their ends. The L-shaped members 42 and 42' are respectively also pivotally mounted on the outer surfaces of first and second guiding collars 44 and 44' at their central portions and equipped with guide rollers 46 and 46' at the other respective ends. The axes of the guide rollers 46 and 46' respectively extend in the transverse direction with respect to the vehicle cruising direction indicated by the arrow A. The rollers 46, 46' are arranged to be contactable with and follow the first and second guide walls 16a and 16b indicated in FIGS. 1 to 4.

The guiding collars 44 and 44' have respectively threaded bores (no numerals) therethrough. A transverse axle 48 passes through the threaded bores of the guiding collars 44 and 44', and has first and second threaded portions 50 and 50' which respectively extend from the mid-portion of the transverse axle 48 toward the ends of the same. The first and second threaded portions 50 and 50' are respectively engaged with the threaded bores of first and second guiding collars 44 and 44'. The transverse axle 48 is arranged to be rotated by means of an electric motor 52 provided at one end of the transverse axle 48.

A first L-shaped follower support member 54 is pivotally attached at its one end to the outer surface of the first guiding collar 44 and equipped at its other end with a horizontal guide follower 56 and a vertical guide follower 58. The horizontal guide follower 56 is contactable with the side surface of the right guide channel 18a indicated in FIG. 3A, while the vertical guide follower 58 is contactable with the bottom surface 26 of the guide channel 18a. A second L-shaped follower support member 54' is attached to the second guiding collar 44' and has horizontal and vertical guide followers 56' and 58' in a similar manner to the above-mentioned first follower support member 54. The horizontal and vertical guide followers 56' and 58' are respectively contactable with the side and the bottom surfaces of the left guide channel 18b.

Figure 7:
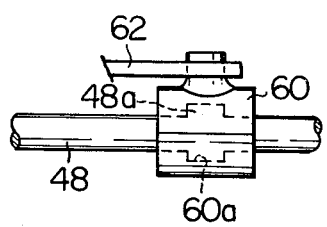
FIG. 7 is an enlarged schematic elevation view of a part of the steering system.

Disposed at the mid-portion of the transverse axle 48 is a rotatable collar 60 which is rotatable around the transverse axle 48 but is not movable in the axial direction of the axle 48. As illustrated in FIG. 7, the rotatable collar 60 has at its inner peripheral surface a radial groove 60a which is in rotatable engagement with a radial projection 48a formed on the outer peripheral surface of the mid-portion of the transverse axle 48.

On the other peripheral surface of the rotatable collar 60, a link 62 is pivotally attached at one end thereof which like link 62 is in turn pivotally connected to one end of an L-shaped link 64 which is pivotally supported by the vehicle body at its central portion. The L-shaped link 64 is pivotally connected at its other end to a drag link 66. The drag link 66 is mechanically operatively connected through a steering knuckle 68 to steerable front wheels 70 (one of which is shown) to angularly move the steerable wheels in response to the transverse directional movement of transverse axle 48 for directional guidance of the vehicle 14. The steerable front wheels 70 are coupled with each other by a steering linkage 71.

Figure 6:
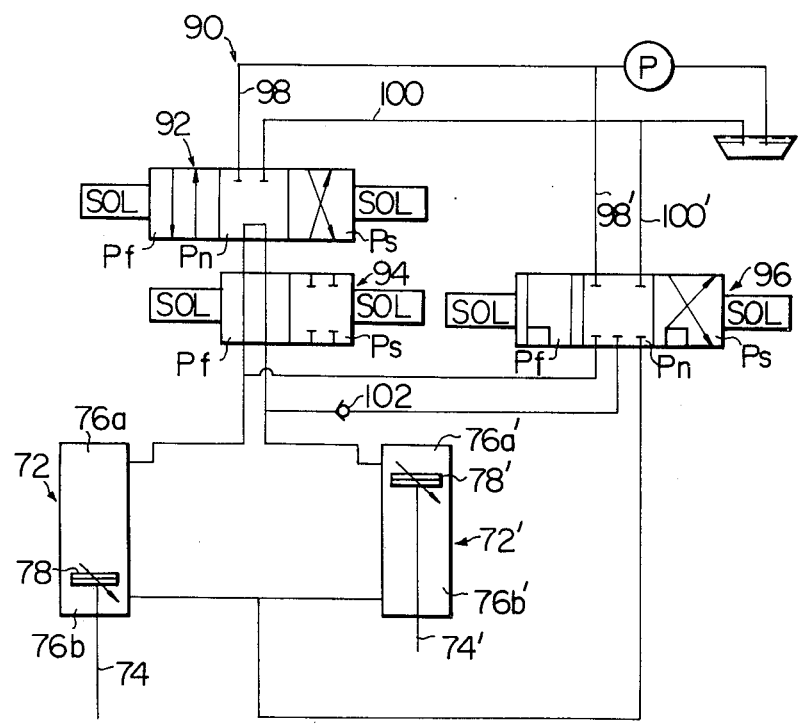
FIG. 6 is a view showing schematically a hyraulic control system constructed in accordance with the invention for controlling the operation of the steering system of FIG. 5.

A first hydraulic cylinder 72 for actuating the L-shaped follower support member 54 is pivotally connected at its one end to the first L-shaped member 42. The first hydraulic cylinder 72 has a piston rod 74 thereof which is pivotally connected to the first L-shaped support member 54 so that the horizontal and vertical guide followers 56 and 58 are movable between the operative position in engagement with the guide channels 18a and the inoperative position out of engagement with the same guide channel. A second hydraulic cylinder 72' and its piston rod 74' operatively connects the second L-shaped member 42' and the second L-shaped follower support member 54' so as to actuate the corresponding vertical and horizontal guide followers 56' and 58' in a similar manner to the first hydraulic cylinder 72 and its piston rod 74. The hydraulic cylinders 72 and 72' are constructed as indicated in FIG. 6 in which the first hydraulic cylinder 72 defines therein a chamber (no numeral) filled with hydraulic fluid which chamber is divided by a first piston 78 into first and second chambers 76a and 76b, while the second hydraulic cylinder 72' defines therein a chamber (no numeral) filled with hydraulic fluid which chamber is divided by a second piston 78 into first and second chambers 76a' and 76b'. The pistons 78 and 78' are respectively connected with the piston rods 74 and 74'.

The first and second guiding collars 44 and 44' have on their outer surfaces projections 80 and 80', respectively. A biasing spring 82 connects the projection 80 and the first L-shaped follower support member 54 so as to urge the guide followers 56 and 58 into the inoperative position once the guide followers 56 and 58 begin to move toward the inoperative position. A biasing spring 82' connects the projection 80' and the second L-shaped follower support member 54' in a similar manner to the biasing spring 82.

The manners of directional guidance of the vehicle 14 at the junctions shown in FIGS. 1 and 2 and operation of the vehicle steering system shown in FIG. 5 will be explained particularly with reference to the schematic diagram in FIG. 6.

In the case where control of the steering system is carried out by using a hydraulic control system generally indicated by reference numeral 90 which is mounted on the vehicle 14, a second solenoid operated valve 94 and a third solenoid operated valve 96 are firstly set into a first position $P_f$ and a neutral position $P_n$, respectively, as indicated in FIG. 6. As shown when a first solenoid operated valve 92 is in a neutral position $P_n$, the first and second pistons 78 and 78' are movable in the opposite direction to each other within the first and second hydraulic cylinders 72 and 72' filled with hydraulic fluid, respectively, since the first chambers 76a and 76a' of the first and second hydraulic cylinders 72 and 72' are hydraulically connected to each other while the second chambers 76b and 76b' of the first and second cylinders 72 and 72' are also hydraulically connected to each other. In this state, the first chamber 76a of the first hydraulic cylinder 72 is designed to contain substantially the same volume of hydraulic fluid as the second chamber 76b' of the second hydraulic cylinder 72' while the second chamber 76b of the first hydraulic cylinder is designed to contain substantially the same volume of hydraulic fluid as the first chamber 76a' of the second hydraulic cylinder 72'.

When the first valve 92 is put into a first position $P_f$, the first chamber 76a of the first cylinder 72 is hydraulically connected to a pressure line 98 from a pressure source (no numeral) while the first chamber 76a' of the second cylinder 72 is connected to a return line 100 to the pressure source. Therefore, the piston rod 74 of the first piston 78 extends outwardly to push the first L-shaped follower support member 54 to put the first horizontal and vertical guide followers 56 and 58 in operative positions in engagement with the right guide channel 18a while the piston rod 74' of the second piston 78' withdraws inwardly into the second cylinder 72' to pull the second L-shaped follower support member 54' to put the second horizontal and vertical guide followers 56' and 58' in the inoperative positions out of engagement with the left guide channel 18b. Then, at the junction 12 as shown in FIG. 1, the vehicle 14 is guided only by the right guide channel 18a and directed from the portion 10a into the portion 10c of the track.

When the first valve 92 is put into a second position $P_s$, the first chamber 76a of the first cylinder 72 is connected to the return line 100 to the pressure source while the first chamber 76a' of the second cylinder 72' is connected to the pressure line 98 from the pressure source and therefore the pistons 78 and 78' move in the directions opposite with respect to those in the case where the first valve 92 is in the first position. Thus, at the junction 12 as shown in FIG. 1, the vehicle 14 is guided only by the left guide channel 18b and directed from the portion 10a into the portion 10b of the track.

In the case where control of the steering system is carried out by using longitudinal movable projections 22a and 22b disposed on the track 10 including the junction 12 as shown in FIG. 1, the first, second and third valves 92, 94 and 96 are put into the neutral position $P_n$, the first position $P_f$ and the neutral position $P_n$, respectively, as shown in FIG. 6. Accordingly, the first and second pistons 78 and 78' move in a relationship that the first piston 78 moves upwardly in FIG. 6 as the second piston 78' moves downwardly and vice versa. In this state, when the longitudinal movable projection 22a disposed within the right guide channel 18a as shown in FIG. 1 is projected upwardly, the first vertical follower 58 of the forwardly moving vehicle (if in engagement with the right guide channel 18a) is pushed up along the sloped surface of the projection 22a in the direction to put it into the inoperative position.

Thereafter, the first L-shaped follower support member 54 as shown in FIG. 5 is urged upwardly by means of the biasing spring 82 to complete the upward movement of the first piston 78 of the first cylinder 72 in FIG. 6. As a result, the second piston 78' of the second cylinder 72' is forced to move downwardly in FIG. 6 and therefore the second guide followers 56' and 58' are allowed to be in engagement with the left guide channel 18b. Accordingly, the vehicle 14 is guided only by the left guide channel 18b and directed from the portion 10a to the portion 10b of the track through the junction 12 as shown in FIG. 1.

On the contrary, when the longitudinal movable projection 22b disposed within the left guide channel 18b as shown in FIG. 1 is projected upwardly, the second vertical follower 58' of the forwardly moving vehicle (if in engagement with the left guide channel 18b) is pushed up along the sloped surface of the projection 22b in the direction to put it into the inoperative position. Thereafter, the second L-shaped follower support member 54' is urged upwardly by means of the biasing spring 82' to put the second guide followers 56' and 58 into the inoperative positions. Then, the first guide followers 56 and 58 are moved downwardly and put into the operative positions in engagement with the right guide channel 18a. Thus, the vehicle 14 is guided only by the right guide channel 18a and directed from the portion 10a to the portion 10c of the track through the junction 12 as shown in FIG. 1.

The directional guidance of the vehicle 14 at the junction 12 as shown in FIG. 1 is carried out as described hereinbefore. However, the directional guidance of the same at the junction 12' as shown in FIG. 2 is carried out as follows. In the track 10 as shown in FIG. 2, the portion 10b is equipped with the longitudinal stationary projection 24a within the right channel 18a thereof, while the portion 10c is equipped with the longitudinal stationary projection 24b within the left guide channel 18b thereof. On the other hand, the hydraulic control system 90 as shown in FIG. 6 is so set that the first, second and third solenoid operated valves, 92, 94 and 96 are in the neutral position $P_n$, the first position $P_f$ and the neutral position $P_n$, respectively as indicated in FIG. 6. In this state, the first and second pistons 78 and 78' move in the relationship that the first piston moves upwardly in FIG. 6 as the second piston 78' moves downwardly and vice versa as mentioned before. Therefore, the vehicle 14 from the portion 10b toward the portion 10a is guided only by the left guide channel 18b while the same from the portion 10c toward the portion 10a is guided only by the right guide channel 18a.

Figure 8:
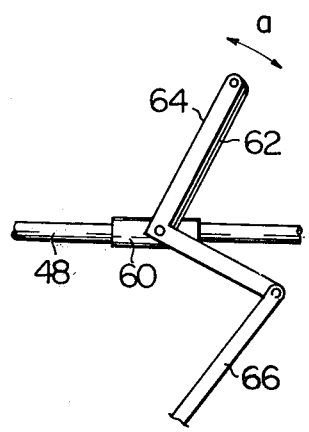
FIG. 8 is a schematic plan view of a part of the steering control system.

The steering system as shown in FIG. 5 is withdrawn within the vehicle body when not required e.g., when the vehicle cruises usual roads other than the track 10 having the guide channels for directional guidance of the vehicle. The withdrawal of the steering system is carried out by operating the hydraulic control system 90 as shown in FIG. 6 in the following manner. First, the second valve 94 is put into the second position $P_s$ putting the first valve 92 into the neutral position $P_n$, and the third valve 96 is put into the second position $P_s$. Then, the second chambers 76b and 76b' of the first and second cylinders 72 and 72' are connected to a pressure line 98' from the pressure source while the first chambers 76a and 76a' of the first and second cylinders 72 and 72' are connected to a return line 100' to the pressure source. As a result, both pistons 78 and 78' are moved upwardly within the corresponding cylinders in FIG. 6 and therefore the first guide followers 56, 58 and the second guide followers 56', 58' are put into the inoperative positions and withdrawn into the positions adjacent to the first and second L-shaped members 42 and 42', respectively. Then, the third valve 96 is put into the neutral positions $P_n$ to maintain the withdrawn state of the automatic steering system. Thereafter, the transverse axle 48 is rotated by operation of the electric motor 52 to move first and second guiding collars 44 and 44' toward each other. Then, the first and second guide rollers 46 and 46' are withdrawn into the vehicle body. In this state, the L-shaped link 64 overlaps on the link 62 as shown in FIG. 8 and therefore the movement of the steerable front wheels 70 is not transmitted to the transverse axle 48 of the automatic steering system but the links 62 and 64 move only in the direction of the arrow a.

On the contrary, for putting the automatic steering system back into the operative position, firstly the first and second guide rollers 46 and 46' are moved in the opposite directions to the outside of the vehicle body by operating the motor 52 to contact the first and second guide walls 16a and 16b, respectively. Thereafter, the third valve 96 is put into the first position $P_f$ so that fluid pressure from the pressure source is applied to the first piston 78 while the pressure is not applied to the second piston 78' by the effect of a check valve 102 as shown in FIG. 6. Then, only the first piston 78 moves downwardly in FIG. 6 to put the steering system into the operative state. Then, the third valve 96 is put into the neutral position $P_n$ to maintain the operative state of the steering system.

It should be understood that the foregoing relates to only a preferred embodiment of the invention, and that it is intended to cover all changes and modifications of the example of the invention herein chosen for the purposes of the disclosure, which do not constitute departures from the spirit and scope of the invention.

What is claimed is:

1. A steering system of a vehicle capable of moving along a track including parallelly extending two guide walls at both sides thereof, two guide channels formed on opposite sides thereof, and junctions where two portions of the track join into one portion, and one portion of the track is branched off into two portions, said steering system comprising:
   first and second support members secured to the vehicle body;
   first and second elongate members pivotally mounted at their one ends on said first and second supporting members, respectively, the elongate members extending generally in the forward direction with respect to the vehicle cruising direction;
   a transverse axle pivotally connecting the other ends of said first and second elongate members, the axles being movable in the transverse direction with respect to the vehicle cruising direction in accordance with the pivotal movement of the elongate members;
   first and second guide rollers movably connected to said first and second elongate members, respectively, and extending in the opposite transverse directions to each other with respect to the vehicle cruising direction so that the first and second guide rollers are contactable with the parallelly extending guide walls of the track;
   first and second follower support members respectively pivotally mounted at one ends thereof on one and the other ends of said transverse axle;
   first and second guide followers respectively movably mounted on other ends of said first and second follower support members, the first and second guide followers being respectively engageable with the two guide channels of the track;
   first and second hydraulic cylinders respectively having piston rods and pivotally mounted on the first and second elongate members, the piston rods pivotally connected to the first and second follower support members, the hydraulic cylinders being hydraulically connected to a hydraulic control system; and
   a linkage mechanically connecting said transverse axle and the steerable wheels of the vehicle so that a transverse movement of the transverse axle is converted into angular movement of the steerable wheels for directional guidance of the vehicle.

2. A steering system as claimed in claim 1, further comprising first and second guiding collars, each of which has a threaded bore therethrough, the first elongate member and the first follower support member being mounted on the outer surface of the first guiding collar and the second elongate member and the second follower support member being pivotally mounted on the outer surface of the second guiding collar.

3. A steering system as claimed in claim 2, in which said transverse axle passes through the threaded bores of the first and second guiding collars, the transverse axle having first and second threaded portions which respectively extend from the midportion thereof toward one end portion thereof and toward the other end thereof, the first and second threaded portions being respectively engaged with the threaded bores of said first and second guiding collars, the first and second threaded portions being formed in a manner that said first and second guiding collars are moved toward or away from each other when the transverse axle is rotated by an electric motor.

4. A steering system as claimed in claim 3, in which the threaded transverse axle is equipped with a rotatable collar disposed around the axle, the rotatable collar being rotatable around the axle and fixed in the axial direction of the threaded transverse axle, said linkage being pivotally mounted on the outer surface of the rotatable collar.

5. A steering system as claimed in claim 4, in which said transverse axle has at its outer periphery a radial projection.

6. A steering system as claimed in claim 3, in which said rotatable collar has at its inner peripheral surface a radial groove which is in rotatable engagement with the radial projection of said transverse axle.

7. A transportation system comprising:
   a track defining a vehicle path and providing a support for a vehicle as it moves therealong, said track including junctions where two portions of the track join into one portion, and one portion of the same is branched off into two portions, and right and left side guide channels which are respectively disposed on right and left opposite sides of the track at least near the junction with respect to a vehicle cruising direction, said guide channels extending along said track for providing directional guidance to a vehicle as it moves along the track;
   a vehicle for controlled movement along said track, said vehicle including two steerable supporting wheels, a steering linkage coupling said steerable wheels together, first and second guide followers movably carried by the vehicle, respectively engageable with the right side and left side guide channels to angularly move said steerable wheels for directional guidance of the vehicle, said guide followers being movable between an operative position in engagement with the respective guide channel and an inoperative position out of engagement with the respective guide channel, and means for holding a state where one of said guide followers is in the operative position and the other in the inoperative position when actuated, the state holding means including a first hydraulic cylinder defining therein a chamber which is sealingly separated into first and second chambers by a piston having a piston rod, the piston rod extending through the second chamber to the outside of the first hydraulic cylinder and mechanically connected to said first guide follower to put it into one of the operative and inoperative positions, and a second hydraulic cylinder defining therein a chamber which is sealingly separated into first and second chambers by a piston having a piston rod, the piston rod extending through the second chamber to the outside of the second hydraulic cylinder and mechanically connected to said second guide follower to put it into one of the operative and inoperative positions, the first chamber of the second hydraulic cylinder being hydraulically connected to the first chamber of the first hydraulic cylinder while the second chamber of the second hydraulic cylinder is hydraulically connected to the second chamber of the first hydraulic cylinder, the pistons of the first and second hydraulic cylinders being positioned in a manner that the first chamber of the first hydraulic cylinder contains substantially the same volume of hydraulic fluid as the second chamber of the second hydraulic cylinder while the second chamber of the first hydraulic cylinder contains substantially the same volume of hydraulic fluid as the first chamber of the second hydraulic cylinder; and means for selectively putting one of said guide followers into the operative position and the other into the inoperative position when actuated during actuation of the state holding means.

8. A transportation system as claimed in claim 7, in which the selectively putting means include a first solenoid operated valve carried by the vehicle and hydraulically connected to the first chambers of the first and second hydraulic cylinders, said solenoid operated valve being movable between a first position in which the first chamber of the first hydraulic cylinder is hydraulically connected to a pressure line from a pressure source while the first chamber of the second hydraulic cylinder is hydraulically connected to a return line to the pressure source and a second position in which the first chamber of the first hydraulic cylinder is hydraulically connected to the return line while the first chamber of the second hydraulic cylinder is hydraulically connected to the pressure line.

9. A transportation system as claimed in claim 7, wherein the selectively putting means includes a longitudinal projection which is disposed within one of the guide channels and extending along the guide channel to urge the corresponding guide follower of the moving vehicle in the direction for putting it into the inoperative position to initiate the desired operation of the selecting putting means, the projection being located within the left side guide channel for directing the vehicle to a portion brached off into the right direction with respect to the vehicle cruising direction while the projection being located within the right side guide channel for directing the vehicle to another portion branched off into the left direction with respect to the vehicle cruising direction at a junction where one portion of the track is branched off into two portions, and the projection being located within the left side guide channel for directing the vehicle to one portion from a portion which joins from the right direction with respect to the vehicle cruising direction while the projection is located with the right side guide channel for directing the vehicle to the one portion from another portion which joins from the left direction with respect to the vehicle cruising direction at a junction where two portions of the track join to one portion, and biasing means for urging the piston of the corresponding hydraulic cylinder in the direction to put the corresponding guide follower into the inoperative position to complete the desired operation of the selectively putting means.

10. A transportation system as claimed in claim 7, in which said vehicle further includes means for simultaneously putting both said first and second guide followers into the inoperative positions when actuated.

11. A transportation system as claimed in claim 10, in which the simultaneously putting means includes:

a second solenoid operated valve hydraulically connected to the first chamber of the first hydraulic cylinder and the first chamber of the second hydraulic cylinder, the second solenoid operated valve having a position in which connection between the first chambers of the first and second hydraulic cylinders is cut off; and a third solenoid operated valve connected to the first chambers of the first and second hydraulic cylinders and the second chambers of the first and second hydraulic cylinders, the third solenoid operated valve having a position in which the first chambers of the first and second hydraulic cylinders are connected to the return line to the pressure source while the second chambers of the first and second hydraulic cylinders are connected to the pressure line from the pressure source.

* * * * *